(12) United States Patent
Phillips et al.

(10) Patent No.: US 6,978,659 B2
(45) Date of Patent: Dec. 27, 2005

(54) APPLIANCE LEAK DETECTOR AND INLINE SHUTOFF

(75) Inventors: David L. Phillips, Santa Ana, CA (US); Jeffrey A. Cain, Santa Margarita, CA (US); James C. Walls, Mission Viejo, CA (US)

(73) Assignee: ITT Manufacturing Enterprises, Wilmington, DE (US)

( * ) Notice: Subject to any disclaimer, the term of this patent is extended or adjusted under 35 U.S.C. 154(b) by 117 days.

(21) Appl. No.: 10/745,944

(22) Filed: Dec. 24, 2003

(65) Prior Publication Data

US 2005/0138990 A1 Jun. 30, 2005

(51) Int. Cl.$^7$ .............................................. G01M 3/04
(52) U.S. Cl. ........................................ 73/40; 340/605
(58) Field of Search ................. 7/40, 40.5 R; 137/312; 174/11 R; 702/51; 340/603, 604, 605

(56) References Cited

U.S. PATENT DOCUMENTS

| | | | |
|---|---|---|---|
| 3,098,116 A | 7/1963 | Jore et al. | |
| 4,206,632 A * | 6/1980 | Suzuki | 73/40.5 R |
| 4,386,231 A | 5/1983 | Vokey | |
| 4,598,277 A | 7/1986 | Feldman | |
| 4,677,371 A | 6/1987 | Imaizumi | |
| 4,843,305 A | 6/1989 | Akiba | |
| 5,084,679 A | 1/1992 | Löfgren | |
| 5,153,564 A * | 10/1992 | Hoiberg | 340/604 |
| 5,190,069 A | 3/1993 | Richards | |
| 6,057,770 A * | 5/2000 | Justesen | 340/605 |
| 6,147,613 A * | 11/2000 | Doumit | 340/605 |

OTHER PUBLICATIONS

Google definitions for "servovalve" and "solenoid valve", Merriam-Webster Online definitions for "hydrophilic" and "porous", 6 pages.*

* cited by examiner

*Primary Examiner*—Charles Garber
(74) *Attorney, Agent, or Firm*—Ware, Fressola, Van Der Sluys & Adolphson LLP

(57) ABSTRACT

A leak sensor apparatus (10) and flow control equipment (16) for sensing a leak from a machine using a supply of water (or other fluid) or from connecting hoses supplying the water, and for turning off the supply when a leak is detected, with the leak sensor (10) itself including in particular two conductors (10*a–b*) held in spaced apart relation in a fluid-permeable insulating material (10*c*), and the flow control equipment (16) for providing a voltage difference between the two conductors (10*a–b*) and for sensing the presence of a fluid based on the fluid providing an electrical path between the two conductors (10*a–b*) and so allowing current to flow between the two conductors (10*a–b*) under the urging of the voltage difference provided by the flow control equipment (16). In some embodiments, the two conductors (10*a–b*) are configured so as to wrap about one or more of the connecting hoses.

32 Claims, 2 Drawing Sheets

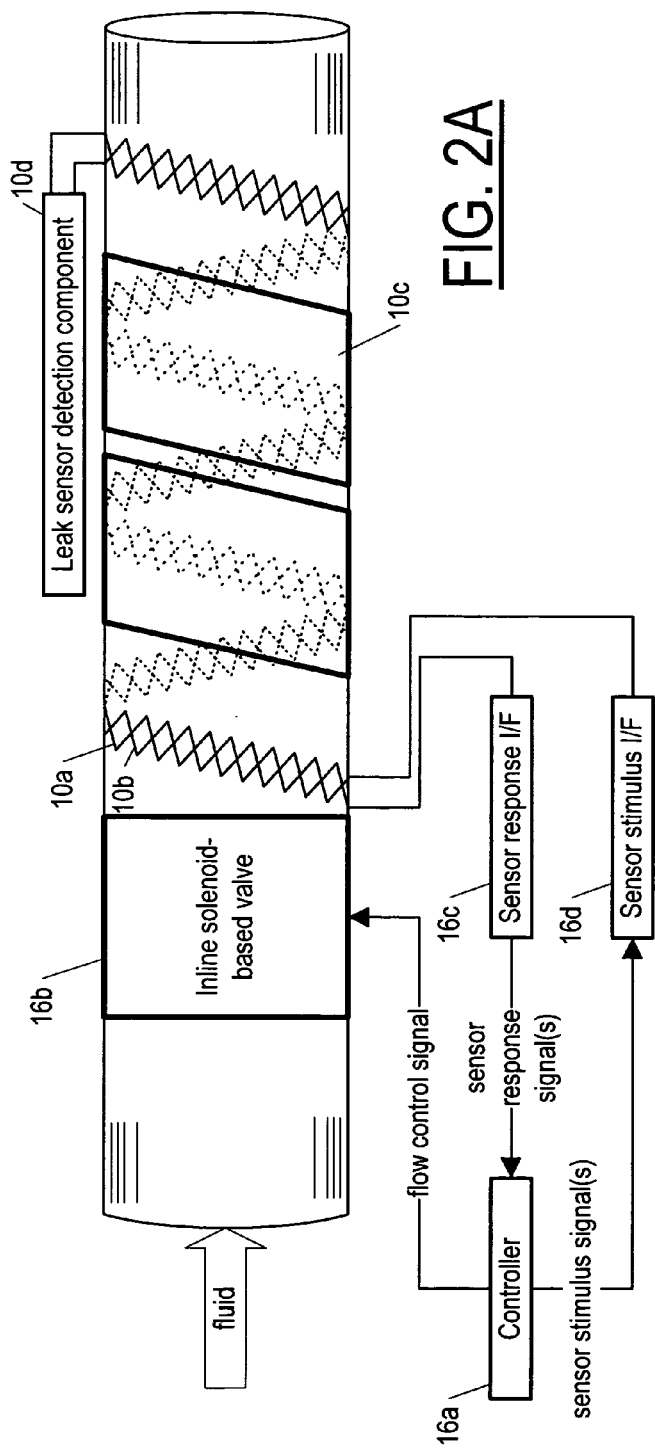
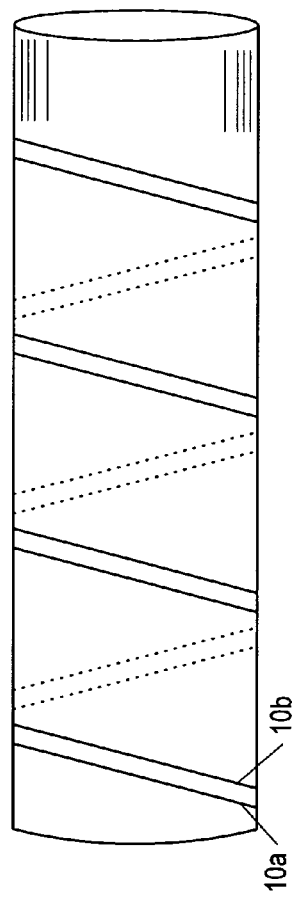
FIG. 2A
FIG. 2B

APPLIANCE LEAK DETECTOR AND INLINE SHUTOFF

TECHNICAL FIELD

The present invention pertains to the field of fluid flow control. More particularly, the present invention pertains to equipment used for sensing a leak in machinery and/or attached hoses through which a fluid flows, machinery such as a washing machine.

BACKGROUND ART

In case of machinery being supplied with water via attached hoses, machinery such as a washing machine, and especially in case of such machinery being located inside a home, it is advantageous to detect water escaping from the machinery and/or attached hoses, as quickly as possible, and to then stop the flow of water.

Of the prior art in this area, U.S. Pat. No. 5,190,069 teaches a device for shutting off water to a pipe when sensing water leaking from the pipe, with the sensing provided by a sensor based on a tape including spaced apart conductors and liquid cell sensor elements and wrapped around the pipe. The conductors are insulated from each other everywhere except in the liquid cell sensor elements, where they are stripped bare but still held in spaced-apart relation. When water enters a liquid cell sensor element, it provides a conducting path between the two stripped-bare portions of the two conductors in the cell.

U.S. Pat. No. 4,386,231 and U.S. Pat. No. 4,598,277 each teach using two conductors disposed in spaced apart relation and held so by insulating material, in an arrangement in which leaked water provides a conducting path connecting the two conductors. The '231 patent shows conductors on an insulating substrate/tape, and teaches the optional use of porous material for covering the conductors on the insulating substrate/tape. The '277 patent shows fabric mesh holding conductors in spaced-apart relation, and teaches impressing a voltage across the conductors and arranging that the voltage so impressed gives rise to a warning in case of a leak.

All of the above-mentioned patents disclose devices useful in not only detecting a leak, but also for indicating the location of the leak. To do so—i.e. to not only detect a leak but also to determine its location—a relatively elaborate construction is required. In the latter two patents, a sensor is used of a type that confines the effect of the leak to the location where the leak first occurs. In the first patent, a different sensor is used in each of several different zones. Also in the first patent, the construction of each sensor is complicated by the aim of avoiding sensing water that has merely condensed onto the sensor equipment, as opposed to water actually leaking (i.e. in some significant quantity) from a pipe.

Compared to the rather more industrial-grade sensor devices of the prior art, what is still needed for many applications—especially residential—is a sensor and controller apparatus that is relatively simple and easy to install, and so more reliable and also less expensive.

DISCLOSURE OF THE INVENTION

Accordingly, in a first aspect of the invention, a system is provided for detecting when a fluid is leaking from a machine or from one or more connecting hoses providing and removing the fluid from the machine, the system comprising: a leak sensor apparatus having two conductors held in spaced apart relation in a fluid-permeable insulating material, responsive to an impressed voltage causing a voltage difference between the two conductors, for providing a leak detection current when fluid from the machine leaks through the fluid-permeable membrane; and a flow control device, for providing the impressed voltage, for stopping the flow of the fluid to the machine in response to the sensor response signal.

In accord with the first aspect of the invention, further in response to the leak detection current, the flow control device may stop providing the impressed voltage.

Also in accord with the first aspect of the invention, the leak sensor apparatus may also include a leak sensor detection component completing a circuit path for an alternating or radiofrequency current of a higher frequency than the leak detection current, and the flow control device may be configured to provide an impressed voltage corresponding to the higher-frequency current and to detect the higher-frequency current in order to determine if the leak sensor apparatus is coupled to the flow control device.

Also in accord with the first aspect of the invention, the two conductors may be provided in a configuration adapted so as to be disposed on a surface beneath the machine.

Also in accord with the first aspect of the invention, the two conductors may be configured so as to wrap about one or more of the connecting hoses.

Also in accord with the first aspect of the invention, the flow control apparatus may include: a sensor stimulus interface module for impressing a voltage across the pair of conductors; a sensor response interface module, for providing a sensor response signal in response to the leak detection current; a controller, responsive to the sensor response signal, for providing a flow control signal for stopping the flow of the fluid to the machine upon receiving the sensor response signal; and a flow control valve, responsive to the flow control signal, for stopping the flow of the fluid upon receiving the flow control signal. Further, the flow control valve may include a valve apparatus having a valve disposed in-line with a supply of the fluid to the machine and including a solenoid to open and close the valve.

Also in accord with the first aspect of the invention, at least one of the two conductors may be made of a spring wire.

Also in accord with the first aspect of the invention, at least one of the two conductors may be made of a aluminum, steel, a conductive polymer, an alternative metal, or a carbon-based material.

Also in accord with the first aspect of the invention, a grounded portion of a connecting pipe or connecting hose or a grounded portion of the machine may be used as a return path for the sensor output current and so serves as one of the two conductors.

Also in accord with the first aspect of the invention, the two conductors may be disposed so as to form a double helix.

Also in accord with the first aspect of the invention, the pair of conductors may be attached to a mechanically formative component to direct or fix the shape of the leak sensor apparatus.

Also in accord with the first aspect of the invention, the fluid-permeable insulating material may be a sheathing on at least one of the conductors, and may have enhanced environmental robustness.

Also in accord with the first aspect of the invention, the fluid-permeable insulating material may be a sheathing having enhanced usability attributes including a fast-drying or slow-drying or self-drying characteristic.

Also in accord with the first aspect of the invention, the permeability of the fluid-permeable insulating material may be provided by one or more of the following characteristics: hydrophilicity; porosity; open construction; membrane action; and capillary action.

Also in accord with the first aspect of the invention, the fluid-permeable insulator material may include one or more of the following materials: woven fibers of natural or synthetic material including woven glass polyesters and cotton; flexible natural or synthetic solids, such as rubber, latex or plastic; and rigid or semi-rigid materials including fiberglass and composites.

Also in accord with the first aspect of the invention, the two conductors may be provided as a solid or stranded metal wire or are a material impregnated with solid or stranded metal wire, such as a flexible material.

Also in accord with the first aspect of the invention, the two conductors may be provided in one of the following forms: helical; circular; straight; patterned; or free-form.

Also in accord with the first aspect of the invention, the two conductors are provided having proximate distal ends and are terminated at their distal ends by either elastic bands, flexible bands or rigid fasteners.

In a second aspect of the invention, a machine is provided having a hose for receiving or discharging a fluid, characterized in that: electrical conductors separated from each other by a fluid-permeable insulating material are arranged in fixed proximate relation to the hose or the machine, and adapted so as to be responsive to a first signal and to fluid leaking from the hose, and so as to provide a second signal to a flow control device that determines whether there is a possible leak in the hose.

In accord with the second aspect of the invention, the electrical conductors may be helically wrapped or intertwined in the insulating porous material.

Also in accord with the second aspect of the invention, the electrical conductors may be helically wrapped around the hose.

Also in accord with the second aspect of the invention, the electrical conductors may be either a formed spring wire or a helical formed spring wire.

Also in accord with the second aspect of the invention, the electrical conductors may be helically wrapped end-to-end around the hose.

Also in accord with the second aspect of the invention, the control device may provide a signal that stops the flow of the fluid to the machine.

Also in accord with the second aspect of the invention, the fluid-permeable insulating material may be a fluid-permeable cloth.

Also in accord with the second aspect of the invention, the fluid-permeable insulating material may hold the electrical conductors in spaced apart relation.

Also in accord with the second aspect of the invention, the machine may have a sensor stimulus module for providing the first signal.

Also in accord with the second aspect of the invention, the machine may be a washing machine.

In a third aspect of the invention, a kit is provided for adapting on a machine having a hose for receiving or discharging a fluid, characterized in that the kit comprises: electrical conductors separated from each other by a fluid-permeable insulating material, for arranging in fixed proximate relation to the hose or the machine, and adapted to respond to a first signal and to fluid leaking from the hose by providing a second signal; and a flow control device, responsive to the second signal, for determining whether there is a possible leak in the hose.

BRIEF DESCRIPTION OF THE DRAWINGS

The above and other objects, features and advantages of the invention will become apparent from a consideration of the subsequent detailed description presented in connection with accompanying drawings, in which:

FIGS. 2A and 2B are block diagrams/flow diagrams of embodiments of an apparatus according to the invention with the leak sensor configured specifically for detecting a leak from connecting hoses.

BEST MODE FOR CARRYING OUT THE INVENTION

Figure 1:
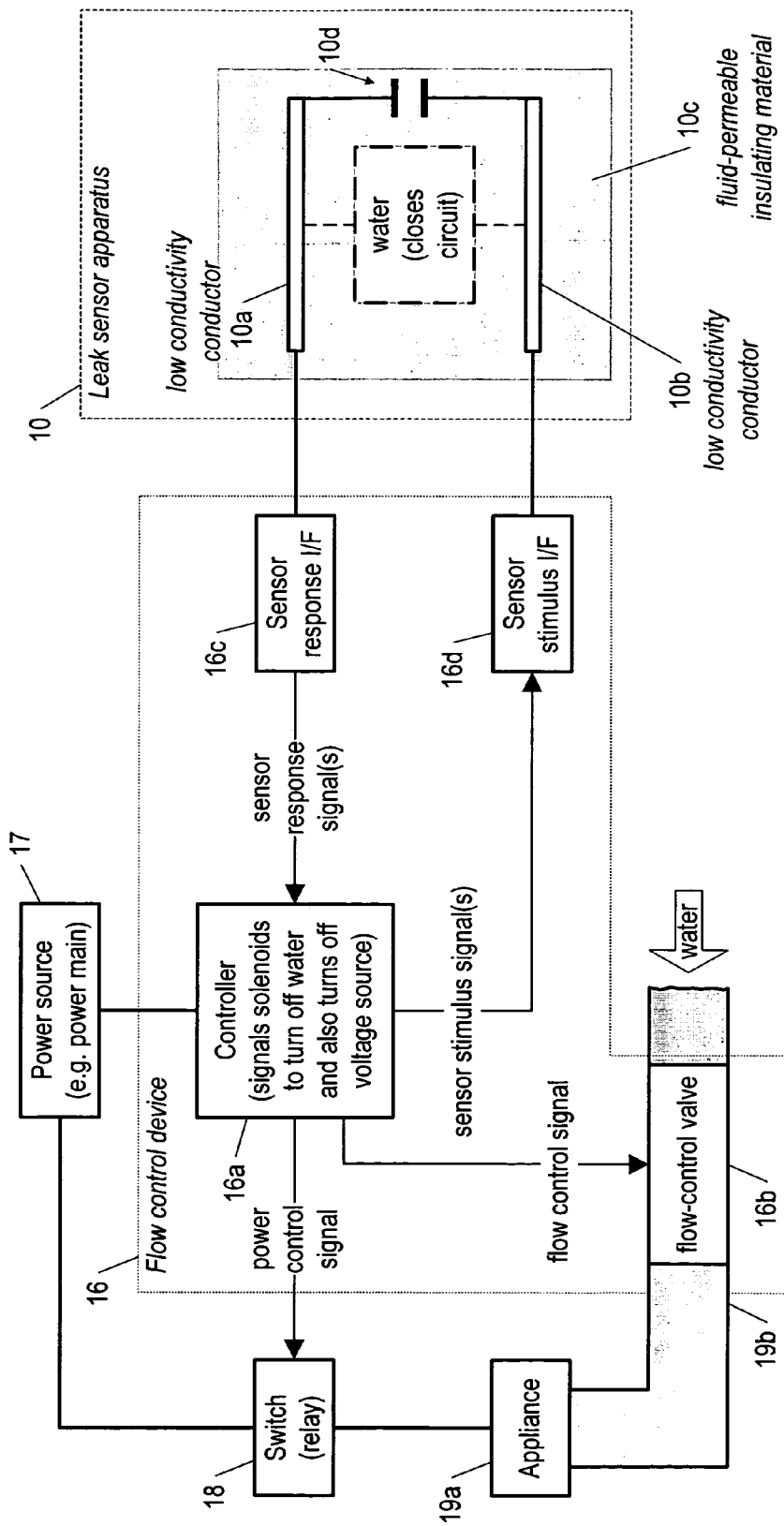
FIG. 1 is a block diagram/flow diagram of an apparatus according to the invention for sensing a leak from a machine using a source of water or from connecting hoses, and for shutting off the source of water.

Referring now to FIG. 1, the invention provides a system 10 16 for detecting when a fluid—such as water—is leaking from a machine/appliance 19a (such as a washing machine) having a running or trapped supply of the fluid (not shown), or is leaking from one or more connecting hoses 19b providing or removing the fluid from the machine.

The invention includes a leak sensor apparatus 10 and a flow control device 16 including one or more flow control valves 16b (e.g. inline solenoid-based valves). The flow control device 16 includes a controller 16a that is typically microcontroller-based and serves as a decision-making section, a sensor response interface module 16c, and a sensor stimulus interface module 16d, i.e. a stimulus signal synthesis circuit for providing a sensor stimulus signal. The leak sensor apparatus 10 in turn includes a pair of conductors 10a–b disposed in spaced-apart relation in a fluid-permeable insulator material 10c, and advantageously also a leak sensor detection component 10d for enabling the controller 16a to verify proper connection and integrity of the conductors 10a–b (i.e. to detect whether the leak sensor apparatus is actually and correctly coupled to the flow control device and that the leak sensor is undamaged). The leak sensor detection component 10d can be as simple as an AC bypass element, such as a capacitor, but can also be a more sophisticated electronic module, as appropriate for a particular application.

The sensor stimulus signal is advantageously composed of a low-frequency AC (alternating current) or DC (direct current) base signal on which an alternating current or radiofrequency signal is superimposed or pulsed. The base signal is used for leak detection. The superimposed signal, which in case of (lower frequency) alternating current base signal is of a higher frequency (but typically below radio interference frequencies), is used to verify the presence and integrity of the sensor. Thus, in addition to providing an impressed voltage that would cause the base current to flow in case of a leak, the flow control device 16 is sometimes configured to provide an impressed voltage corresponding to the higher-frequency current (the superimposed current) and to detect the higher-frequency current in order to determine if the leak sensor apparatus 10 is undamaged and is correctly coupled to the flow control device 16. The current flowing in the two conductors 10a–b as a result of the base signal and in case of a leak is here called a leak detection current. A current as a result of the base signal can flow to some extent even in the absence of a leak, but the equipment is configured so that current corresponding to the base signal is ignored unless it exceeds a threshold, a threshold which might be adjusted for the application once and for all, or might be adjustable after the leak sensor apparatus is installed, either automatically or manually.

In the absence of a leak, for low frequency AC or else DC an open or very high impedance circuit is formed by the two conductors 10a–b and the leak sensor detection component 10d. A leak resulting in fluid appearing between the two conductors 10a–b after permeating the fluid-permeable insulating material 10c completes the circuit, and by virtue of the sensor stimulus module 16d (e.g. a voltage source), the base signal current (low frequency AC or else DC)—or what can be called the sensor output current—flows through the two conductors 10a–b and into the sensor response interface module 16c, which then generates a sensor response signal compatible with the microcontroller inputs. The arrangement of the flow control device is such that the sensor response signal is applied to the controller 16a.

In response to a sensor response signal indicating a leak (as opposed to other possible signals from the sensor response interface), the controller 16a stops the flow of fluid to the machine/appliance by means of a flow control signal to the flow control valves 16b. The controller 16a may also be configured to turn off the voltage source to the machine/appliance 19a by providing a power control signal to a switch or relay 18 so as to disconnect the appliance from the power source 17, as shown in FIG. 1.

In a typical embodiment, the flow control valve 16b is an in-line solenoid-based valve 16b, i.e. a valve apparatus having a valve disposed in-line with a supply of the fluid to the machine and including a solenoid to open and close the valve. The valve apparatus is constructed so that it is "normally closed," i.e. closed unless power is applied to it by the controller 16a. Under normal, non-fault conditions, the controller 16a applies voltage to the valve solenoid to maintain it in an "open" position, allowing fluid to flow to the machine. Upon sensing a leak, i.e. in response to a sensor response signal indicating a leak, the controller 16a terminates electrical power to the valve solenoid, causing the solenoid to close. (The flow control valves 16b need not, of course, be physically co-located with the controller 16a, and indeed is usually physically separated.)

The flow control device 16 need not necessarily actuate an in-line solenoid; it can be any device that provides a signal that either turns off the machine, turns off a source of the fluid being received, or turns off both—as long as it causes the fluid to stop flowing in a manner suitable for the application (e.g. in some applications, it would stop the fluid from flowing to the machine/appliance 19a).

Also advantageously in some embodiments, the flow control device 16 is configured so that in case of a leak having been detected and the flow of water stopped by the flow control device 16, a reset (power cycling) control (button) must be activated (depressed) or the flow control device 16 must be unplugged and plugged back in before the flow control device 16 will allow water to flow again to the machine/appliance.

In general, the sensor response interface module 16c serves to condition incoming analog signals from the leak sensor apparatus 10 so as to present the signals in a form suitable for input to the controller 16a. The circuitry of the sensor response interface module may, in some embodiments, discriminate between DC and AC components of an incoming analog signal, or it may discriminate between multiple frequency components of the signal, or it may amplify or attenuate the signal and possibly also convert a range of analog voltages to distinct high or low levels corresponding to digital logic.

In some embodiments, the two conductors 10a–b are provided in a configuration adapted so as to be disposed on a surface beneath the machine. For example, the two conductors 10a–b are provided in a substantially flat configuration and held apart in the fluid-permeable insulating material 10c. The elevation of the configuration is preferably an inch or less, so as to allow sliding the configuration underneath the machine (e.g. a washing machine).

In some other embodiments, and now referring to FIG. 2A, the two conductors 10a–b are configured so as to wrap about one or more of the connecting hoses. In some such embodiments, as shown in FIG. 2A, the two conductors 10a–b may themselves be intertwined (so as to form a double helix), in which case they are each individually sheathed in the fluid-permeable insulating material 10c (only partially shown in FIG. 2A for clarity) and so held in spaced-apart relation even though intertwined. Advantageously, when used with a connecting hose, the fluid-permeable insulating material 10c not only insulates the two conductors 10a–b from each other—i.e. individually sheathes them and holds them in spaced apart relation—but is provided so as to allow wrapping in such a way as to completely enclose at least a length of the connecting hose (as only approximately shown in FIG. 2A, since some spacing between successive wraps is shown for clarity), and so the possibility is small that a leak could occur and produce any appreciable buildup of water before it is detected by the invention and the flow of water is stopped.

In embodiments in which the two conductors 10a–b are configured so as to wrap about one or more of the connecting hoses, and as shown in FIG. 2B, the two conductors 10a–b are disposed parallel to each other—as opposed to intertwined as in FIG. 2A—again each individually sheathed in the fluid-permeable insulating material 10c (not shown in FIG. 2B for clarity) and so held in spaced-apart relation. Again, advantageously, the fluid-permeable insulating material 10c configured not only to insulate and hold the two conductors 10a–b in spaced apart relation, but also so as to allow wrapping about a connecting hose in such a way as to enclose at least some length of the hose.

FIG. 2A also shows the leak detector detection component 10d (e.g. a capacitor) attached at the distal end of the pair of conductors 10a–b so as to be of use in detecting a break or other damage in either of the pair of conductors at any point along the length of either of the conductors 10a–b.

The two conductors 10a–b are advantageously for many applications relatively poor conductors so that a variety of materials can be used in the construction of the conductors. For example, the conductors can be made not from a good conductor like copper, but from aluminum or steel or even conductive polymers, or can even be formed from materials used in making carbon resistors. In addition, the two conductors 10a–b can be provided as a solid or stranded metal (or otherwise conducting) wire or as a material impregnated with solid or stranded metal (or other conducting material) wire, and so, especially in case of the stranded wire, can be highly flexible. Instead of using flexible conductors, the pair of conductors 10a–b can be attached to a mechanically formative element to direct or fix the shape of the two conductors 10a–b, i.e. to provide them in a pre-formed configuration. In case of providing the two conductors 10a–b in a pre-formed configuration, such configurations advantageously include: helical; circular; straight; and patterned (woven). Also, two conductors 10a–b can be provided so that the end of one is held near an end of the other with e.g. elastic bands, flexible bands or rigid fasteners.

In some embodiments, one of the pair of conductors 10a–b can be a path to ground. For example, in case of disposing the hand 10 about a connecting hose, if the connecting hose is metallic and has a conducting path to ground, then only one conductor 10a need be wrapped about the connecting hose, which itself provides the other conductor 10b of the pair of conductors 10a–b.

The fluid-permeable insulator material 10c is advantageously a water-permeable cloth (possibly synthetic), and can be provided as a sheathing, and in particular as a sheathing having enhanced environmental robustness, i.e. able to stand up to chemical and physical attack without wearing down, wearing away or otherwise materially degrading so as to no longer hold in spaced-apart relation the pair of conductors 10a–b. Besides such toughness, the fluid-permeable insulator material 10c is advantageously a material having a fast-drying or slow-drying or self-drying characteristic. The permeability of the fluid-permeable insulating material 10c can be provided e.g. by one or more of the following characteristics: hydrophilicity (i.e. e.g. the material tends to absorb); porosity; open construction (i.e. open-celled construction, allowing the fluid to flow through the cells and so move through the fluid-permeable insulating material 10c); membrane action; and capillary action (i.e. e.g. the material tends to wick). Also, the fluid-permeable insulator material 10c can include one or more of the following materials: woven fibers of natural or synthetic material including woven glass polyesters and cotton; flexible natural or synthetic solids, such as rubber, latex or plastic; and rigid or semi-rigid materials including fiberglass and composites.

Even in case of providing the fluid-permeable insulator material 10c as a sheathing, it need not sheath both of the pair of conductors 10a–b. In many applications, only a single one of the conductors need be sheathed. All that is required is that the fluid-permeable insulator material 10c insulate one of the pair from the other except in case of a leak.

In some embodiments, the fluid-permeable insulating material 10c holding the conductors 10a–b is a wicking material, i.e. a material that readily absorbs and disperses fluid. In other embodiments, it is a combination of materials having different functions.

Also, the leak sensor 10 and flow control device 16 are (in combination) configured and adapted—by choice of materials and operating parameters and by component and logic design—to keep open the water source even in the presence of some amount of sensed fluid, so that e.g. mere condensation on a connecting hose does not prompt the controller 16a to shut off the supply of water. For example, the sensor response interface module 16c may provide as a sensor signal an indication to the controller 16a of the relative exposure of the leak sensor apparatus 10 to moisture, the signal being e.g. in the form of an electrical current of the current flowing between the conductors 10a–b or in the form of a voltage across the conductors 10a–b. The controller 16a may be set so that mere condensation (providing a current path that is presumably limited) does not cause the controller to stop the supply of fluid.

In addition, the controller 16a is advantageously shielded from the effects of momentary spikes and other perturbations in utility power by conditioning elements in the power supply and supporting circuitry. A complete loss of electrical utility power causes the controller 16a to lose the ability to supply power to the valve solenoid 16b, causing the valve 16b to return to the "closed" position. Thus, a loss of utility power automatically and unavoidably stops the flow of fluid to the appliance and connected hoses.

The controller 16a also advantageously can discriminate between valid leak conditions and signal noise or other transitory or sustained signal anomalies (the discrimination made possible by algorithmic implementations in the controller and conditioning elements in the supporting circuitry).

Advantageously, the voltage applied to the sensor conductors 10a–b is as low as possible, of a magnitude below what is generally recognized as the minimum required for shock hazard. Typical voltages applied to the sensor are on the order of five volts or less, with available short-circuit currents of five milliamperes or less. Advantageously, the voltage applied to the sensor and the available current may be increased essentially without limit according to the needs and suitability of the application.

To make it possible to turn the supply of water back on after the fluid-permeable insulating material 10c becomes wet because of a leak, the fluid-permeable insulating material 10c is preferably a quick-drying material, such as a synthetic cloth e.g. of the type swimming trunks are made from (e.g. nylon). A hot-air blower (e.g. a hair dryer) can then be used to quickly dry the fluid-permeable insulating material 10c after wiping up any excess water, and the system can then be re-activated. Alternatively, after a leak the entire leak sensor apparatus 10 (including the conductors 10a–b in the fluid-permeable insulating material 10c that has become wet because of the leak) can be swapped for a dry replacement. In that case, if the conductors 10a–b are wrapped about a hose, the hose with the wrapped conductors 10a–b can be replaced.

The invention can either be provided as one or more different kinds of kits for use with respective kinds of machines, or can be provided at the manufacturing stage as part of a machine.

Although the invention is shown having a sensor stimulus module 16d and a sensor response interface module 16c separate from the controller 16a, in some embodiments or applications either the sensor stimulus module 16d or the sensor response interface module 16c or both can be integral with the controller 16a.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A system for detecting when a fluid is leaking from a machine or from one or more connecting hoses providing and removing the fluid from the machine, the system comprising:

a leak sensor apparatus (10) having two conductors (10a–b) held in spaced apart relation in a fluid-permeable insulating material (10c), responsive to an impressed voltage causing a voltage difference between the two conductors (10a–b), for providing a leak detection current when fluid from the machine leaks through the fluid-permeable membrane (10c); and a flow control device (16), for providing the impressed voltage, for stopping the flow of the fluid to the machine in response to the leak detection current;

wherein the leak sensor apparatus (10) also includes a leak sensor detection component (10d) completing a circuit path for an alternating or radiofrequency current of a higher frequency than the leak detection current, and wherein the flow control device (16) is configured to provide an impressed voltage corresponding to the higher-frequency current and to detect the higher-frequency current in order to determine if the leak sensor apparatus (10) is coupled to the flow control device (16).

2. A system as in claim 1, wherein further in response to the leak detection current, the flow control device (16) stops providing the impressed voltage.

3. The system as in claim 1, wherein the two conductors (10a–b) are provided in a configuration adapted so as to be disposed on a surface beneath the machine.

4. The system as in claim 1, wherein the two conductors (10a–b) are configured so as to wrap about one or more of the connecting hoses.

5. A system as in claim 1, wherein the flow control apparatus (16) includes:
   a sensor stimulus interface module (16d) for impressing a voltage across the pair of conductors (10a–b);
   a sensor response interface module (16c), for providing a sensor response signal in response to the leak detection current;
   a controller (16a), responsive to the sensor response signal, for providing a flow control signal for stopping the flow of the fluid to the machine upon receiving the sensor response signal; and
   a flow control valve (16b), responsive to the flow control signal, for stopping the flow of the fluid upon receiving the flow control signal.

6. The system as in claim 5, wherein the flow control valve includes a valve apparatus having a valve disposed in-line with a supply of the fluid to the machine and including a solenoid to open and close the valve.

7. A system as in claim 1, wherein at least one of the two conductors (10a–b) is made of a spring wire.

8. A system as in claim 1, wherein at least one of the two conductors (10a–b) is made of a aluminum, steel, a conductive polymer, an alternative metal, or a carbon-based material.

9. A system as in claim 1, wherein a grounded portion of a connecting pipe or connecting hose or a grounded portion of the machine is used as a return path for the sensor output current and so serves as one of the two conductors (10a–b).

10. A system as in claim 1, wherein the two conductors (10a–b) are disposed so as to form a double helix.

11. A system as in claim 1, wherein the fluid-permeable insulator material (10c) is a water-permeable cloth.

12. A system as in claim 1, further comprising additional hoses and respective additional pairs of conductors (10a–b) wrapped around the additional hoses.

13. A system as in claim 1, wherein the pair of conductors (10a–b) are attached to a mechanically formative component to direct or fix the shape of the leak sensor apparatus (10).

14. A system as in claim 1, wherein the fluid-permeable insulating material (10c) is a sheathing on at least one of the conductors (10a–b).

15. A system as in claim 1, wherein the fluid-permeable insulating material (10c) is a sheathing having enhanced environmental robustness.

16. A system as in claim 1, wherein the fluid-permeable insulating material (10c) is a sheathing having enhanced usability attributes including a fast-drying or slow-drying or self-drying characteristic.

17. A system as in claim 1, wherein the permeability of the fluid-permeable insulating material (10c) is provided by one or more of the following characteristics: hydrophilicity; porosity; open construction; membrane action; and capillary action.

18. A system as in claim 1, wherein the fluid-permeable insulator material (10c) includes one or more of the following materials: woven fibers of natural or synthetic material including woven glass polyesters and cotton; flexible natural or synthetic solids, such as rubber, latex or plastic; and rigid or semi-rigid materials including fiberglass and composites.

19. A system as in claim 1, wherein the two conductors (10a–b) are provided as a solid or stranded metal wire or are a material impregnated with solid or stranded metal wire, such as a flexible material.

20. A system as in claim 1, wherein the two conductors (10a–b) are provided in one of the following forms: helical; circular; straight; patterned; or free-form.

21. A system as in claim 1, wherein the two conductors (10a–b) are provided having proximate distal ends and are terminated at their distal ends by either elastic bands, flexible bands or rigid fasteners.

22. A machine having a hose for receiving or discharging a fluid, characterized in that:
   electrical conductors (10a–b) separated from each other by a fluid-permeable insulating material (10c) are arranged in fixed proximate relation to the hose or the machine, and adapted so as to be responsive to a first signal and to fluid leaking from the hose, and so as to provide a second signal to a flow control device (16) that determines whether there is a possible leak in the hose;
   wherein the machine also includes a leak sensor detection component (10d) completing a circuit path for an alternating or radiofrequency current of a higher frequency than the second signal, and wherein the flow control device (16) is configured to provide an impressed voltage corresponding to the higher-frequency signal and to detect the higher-frequency signal in order to determine if the electrical conductors (10a–b) are coupled to the flow control device (16).

23. A machine according to claim 22, wherein the electrical conductors (10a–b) are helically wrapped or intertwined in the insulating porous material (10c).

24. A machine according to claim 22, wherein the electrical conductors (10a–b) are helically wrapped around the hose.

25. A machine according to claim 22, wherein the electrical conductors (10a–b) are either a formed spring wire or a helical formed spring wire.

26. A machine according to claim 22, wherein the electrical conductors (10a–b) are both helically wrapped around the hose.

27. A machine according to claim 22, wherein the control device (16) provides a signal that stops the flow of the fluid to the machine.

28. A machine according to claim 22, wherein the fluid-permeable insulating material (10c) is a fluid-permeable cloth.

29. A machine according to claim 22, wherein the fluid-permeable insulating material (10c) holds the electrical conductors (10a–b) in spaced apart relation.

30. A machine according to claim 22, wherein the machine has a sensor stimulus module (10d) for providing the first signal.

31. A machine according to claim 22, wherein the machine is a washing machine.

32. A kit for adapting a machine having a hose for receiving or discharging a fluid, characterized in that the kit comprises:
- electrical conductors (10*a–b*) separated from each other by a fluid-permeable insulating material (10*c*), for arranging in fixed proximate relation to the hose or the machine, and adapted to respond to a first signa arid to fluid leaking from the hose by providing a second signal;
- a flow control device (16), responsive to the second signal, for determining whether there is a possible leak in the hose; and
- a leak sensor detection component (10*d*) completing a circuit path for an alternating or raido frequency current of a higher frequency than the second signal, and wherein the flow control device (16) is configured to provide an impressed voltage corresponding to the higher-frequency signal and to detect the higher frequency signal in order to determine if the electrical conductors (10*a–b*) are coupled to the flow control device (16).

\* \* \* \* \*

UNITED STATES PATENT AND TRADEMARK OFFICE
CERTIFICATE OF CORRECTION

PATENT NO. : 6,978,659 B2  Page 1 of 1
DATED : December 27, 2005
INVENTOR(S) : David L. Phillips et al.

It is certified that error appears in the above-identified patent and that said Letters Patent is hereby corrected as shown below:

Column 10,
Line 64, "(10d)" should be -- (16d) --.

Column 11,
Line 7, "signa arid" should be -- signal and --.

Signed and Sealed this

Twenty-first Day of March, 2006

JON W. DUDAS
*Director of the United States Patent and Trademark Office*